United States Patent [19]

Marshall, Jr.

[11] Patent Number: 5,596,717
[45] Date of Patent: Jan. 21, 1997

[54] FOUR STATE TOKEN PASSING ALIGNMENT FAULT STATE CIRCUIT FOR MICROPROCESSOR ADDRESS MISALIGNMENT FAULT GENERATION

[75] Inventor: Robert D. Marshall, Jr., Garland, Tex.

[73] Assignee: Texas Instruments Incorporated, Dallas, Tex.

[21] Appl. No.: 478,308

[22] Filed: Jun. 7, 1995

[51] Int. Cl.⁶ .................................................. G06F 11/30
[52] U.S. Cl. ................... 395/185.06; 395/185.02
[58] Field of Search .................... 395/185.06, 185.02, 395/183.19, 183.01, 182.15, 182.19, 185.01, 412, 416, 413, 497.03, 375

[56] References Cited

U.S. PATENT DOCUMENTS

| | | | |
|---|---|---|---|
| 4,488,228 | 12/1984 | Crudele et al. | 395/182.19 |
| 5,201,043 | 4/1993 | Crawford et al. | 395/185.02 |
| 5,278,840 | 1/1994 | Cutler et al. | 395/183.01 |
| 5,325,520 | 6/1994 | Nguyen et al. | 395/182.15 |
| 5,455,909 | 10/1995 | Blomgren et al. | 395/183.19 |

*Primary Examiner*—Robert W. Beausoliel, Jr.
*Assistant Examiner*—Ly V. Hua
*Attorney, Agent, or Firm*—Robert D. Marshall, Jr.; James C. Kesterson; Richard L. Donaldson

[57] ABSTRACT

This invention employs a token passing structure for controlling alignment fault generation. This alignment fault state circuit stores one of four states corresponding to whether the operating system permits address misalignment fault generation and whether the application program requests such address misalignment fault generation. If the token is present in a particular latch, then the corresponding state is active. If the token is absent, then the corresponding state is inactive. The presence of the token in a predetermined one of the four states causes a fault gate qualifier signal to be active permitting fault generation on address misalignment. Absence of the token from that state causes the fault gate qualifier signal to be inactive prohibiting fault generation on address misalignment. This structure efficiently implements address misalignment fault control by means of token location. Every token location is accessible at every privilege level. An additional instruction not previously supported by Intel microprocessors and Intel compatible microprocessors permits the application program access to the individual token locations and thus to all the permitted states.

17 Claims, 2 Drawing Sheets

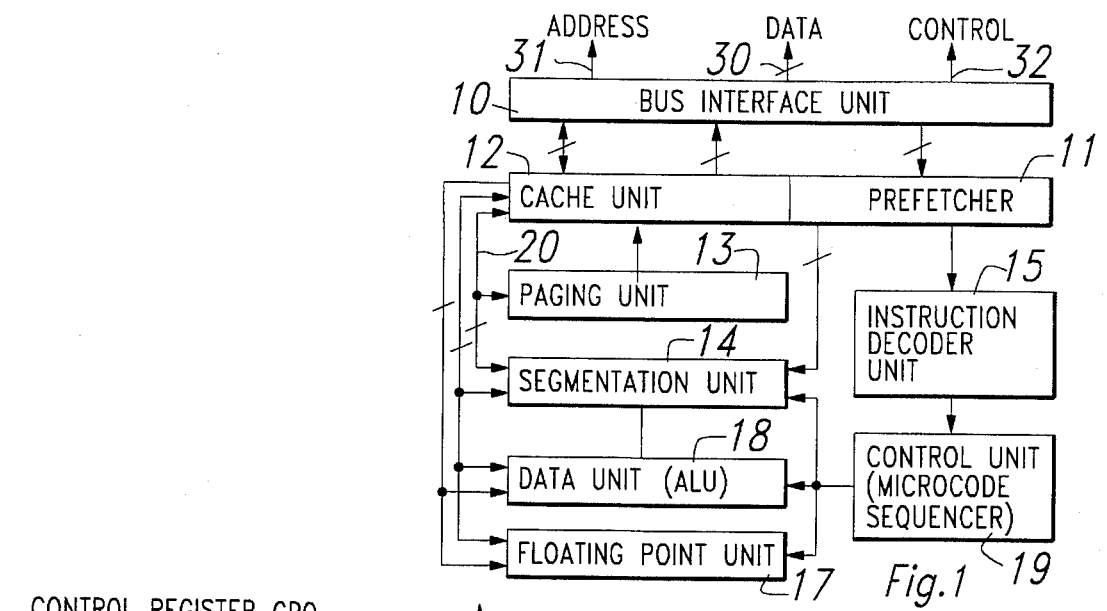
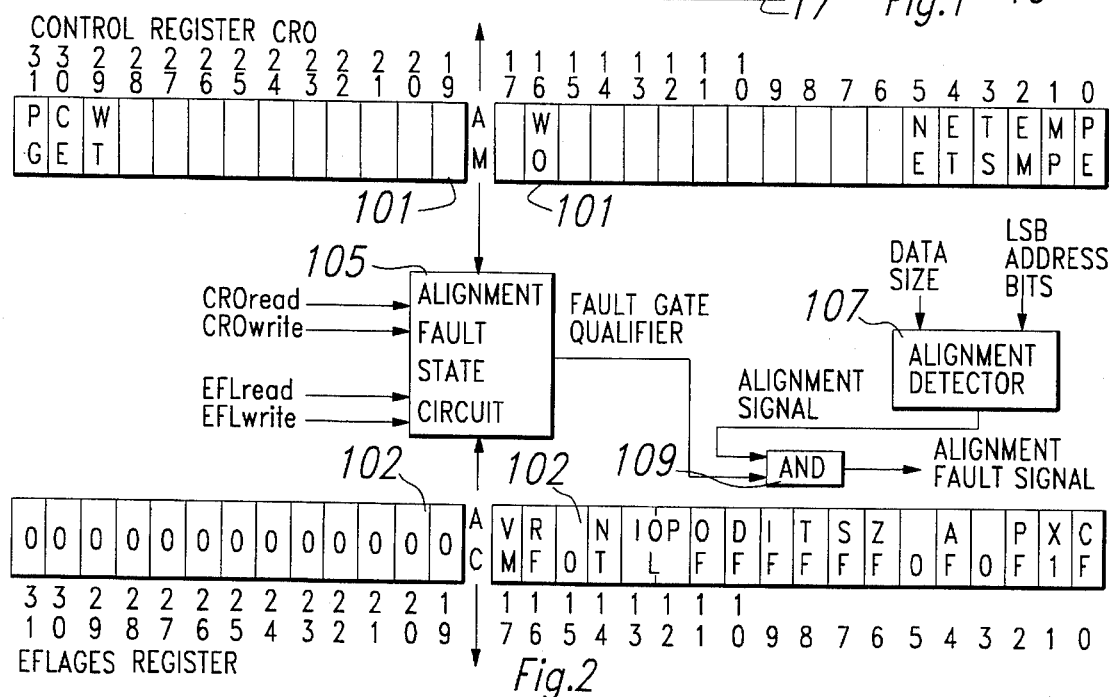
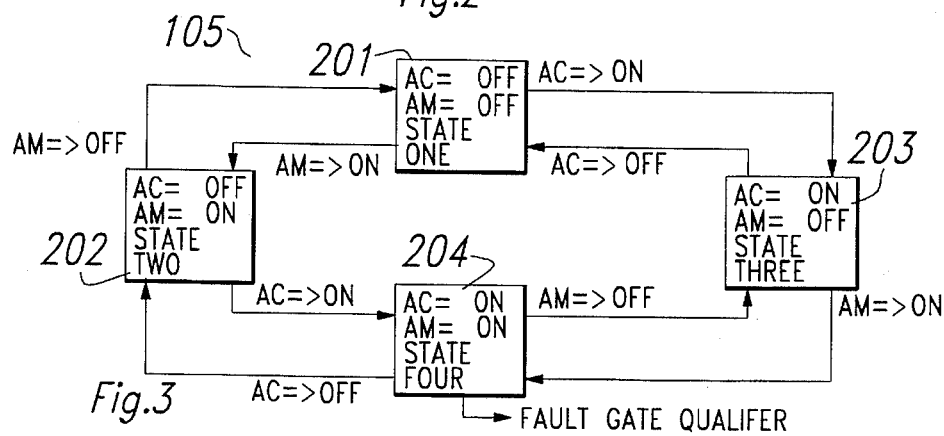

FOUR STATE TOKEN PASSING ALIGNMENT FAULT STATE CIRCUIT FOR MICROPROCESSOR ADDRESS MISALIGNMENT FAULT GENERATION

TECHNICAL FIELD OF THE INVENTION

This invention generally relates to the field of microprocessors and more particularly to control of address misalignment fault generation.

BACKGROUND OF THE INVENTION

An address misalignment fault occurs whenever a generated address does not fit the boundary of a selected word size. The instruction set of Intel 8086, 80286, 80386, 80486 and Pentium microprocessors permits data access to any byte of memory. These microprocessors employ varying word sizes from 8 bits to 64 bits. It is known that references to misaligned addresses entail a performance penalty because some misaligned address references require two memory accesses. However, the later generations of these microprocessors retain the capability to generate and employ misaligned addresses to maintain compatibility with a large body of existing programs. Instruction set compatibility is a very important market factor for the personal computers employing these microprocessors.

A number of other microprocessors do not permit generation of misaligned addresses. Most particularly microprocessors in the RISC (Reduced Instruction Set Computer) class prohibit misaligned address generation. The regularized instruction set and memory accesses common to RISC microprocessors provide many advantages in speed of operation and processing power over the Intel microprocessors employed in most personal computers. To date this theoretical additional computational power of RISC microprocessors has not overcome the overwhelmingly larger base of application programs available for Intel microprocessors. Consequently, RISC microprocessors have found little success in mainstream general purpose personal computers.

It would be desirable in some applications employing Intel microprocessors to permit address misalignment fault generation. Certain AI (Artificial Intelligence) programs employ data typing within the generated address. If address misalignment faults could be selectively generated, then the least significant address bits could be employed to specify these data types. Upon address misalignment fault generation, a fault recovery program, more typically called an interrupt service routine, would access the word aligned address by masking the least significant bits of the address. At the same time the interrupt service routine would signal interrupted program of the data type for proper handling based upon these least significant bits indicating the data type. This technique, which is very useful in AI programs, permits run time specification of data types.

The prior art represented by U.S. Pat. No. 5,201,043 entitled "SYSTEM USING BOTH A SUPERVISOR LEVEL CONTROL BIT AND USER LEVEL CONTROL BIT TO ENABLE/DISABLE MEMORY REFERENCE ALIGNMENT CHECKING" employs a microprocessor based computer system having multiple privilege levels. The operating system has a high privilege level and has control over whether address misalignment fault generation is allowed. The application program has a low privilege level and has control over whether address misalignment fault generation is requested. The operating system stores individual bits in a control register CR0. In accordance with the Intel microprocessor architecture bit eighteen of this control register CR0 stores an alignment masking bit (AM) that allows or disallows address alignment fault detection. The application program stores individual bits in a flags register EFLAGS. In accordance with the Intel microprocessor architecture bit eighteen of the EFLAGS register stores an alignment check (AC) bit which indicates whether address misalignment fault generation is requested by the application program.

SUMMARY OF THE INVENTION

This invention employs a token passing structure for controlling alignment fault generation. This alignment fault state circuit stores one of four states corresponding to whether the operating system permits address misalignment fault generation and whether the application program requests such address misalignment fault generation. If the token is present in a particular latch, then the corresponding state is active. If the token is absent, then the corresponding state is inactive. The presence of the token in a predetermined one of the four states causes a fault gate qualifier signal to be active permitting fault generation on address misalignment. Absence of the token from that state causes the fault gate qualifier signal to be inactive prohibiting fault generation on address misalignment.

This structure efficiently implements address misalignment fault control by means of token location. Every token location is accessible at every privilege level. An additional instruction not previously supported by Intel microprocessors and Intel compatible microprocessors permits the application program access to the individual token locations and thus to all the permitted states.

BRIEF DESCRIPTION OF THE DRAWINGS

These and other aspects of this invention are illustrated in the drawings, in which:

FIG. 1 is a general block diagram of a microprocessor of the type employing this invention;

FIG. 2 is a block diagram of the relationship of the alignment fault circuit of this invention and the registers of the microprocessor;

FIG. 3 is a state diagram of the states of the alignment fault state circuit of this invention.

DETAILED DESCRIPTION OF PREFERRED EMBODIMENTS

Figure 4:
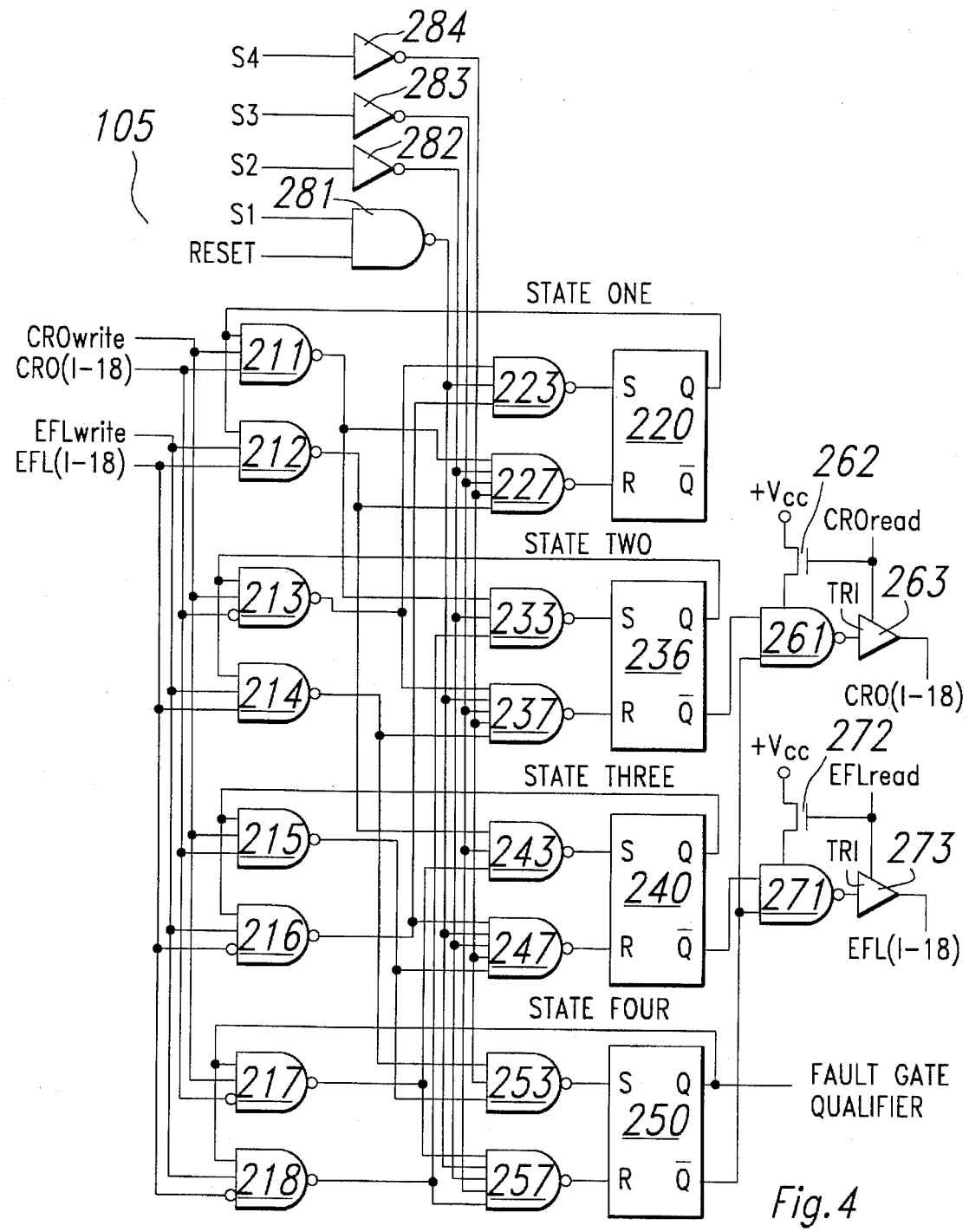
FIG. 4 is a logic diagram of a preferred embodiment of the alignment fault state circuit of this invention.

FIG. 1 illustrates a prior art microprocessor of the type that may employ this invention. The microprocessor includes: bus interface unit 10; prefetcher 11, cache unit 12, paging unit 13, segmentation unit 14; instruction decoder unit 15; floating point unit 17; data unit 18; control unit 19; and internal address bus 20.

Bus interface unit 10 handles communication between the microprocessor and external units. Bus interface unit 10 couples to an external data bus 30, an external address bus 31 and several control lines 32. Bus interface unit 10 couples to prefetcher 11 and cache unit 12. Bus interface unit 10 deals with physical (hardware) addresses only, so operand addresses must first pass through paging unit 13 and segmentation unit 14. Cache unit 12 and prefetcher 11 also couple to bus interface unit 10. Prefetcher 11 continually requests bus interface unit 10 to fetch the contents of the memory at the next instruction address. As soon as prefetcher 11 receives the data, it places it in an instruction queue and, if the queue is not full, requests another word from memory. Cache unit 12 includes a data cache memory and a controller to control the accessing of the data cache memory.

Both prefetcher 11 and cache unit 12 are coupled to segmentation unit 14. Segmentation unit 14 translates segmented addresses into linear addresses used by the external memory system. Segmentation unit 14 is coupled to paging unit 13 and cache unit 12 via linear address bus 20. Linear address bus 20 is also called the "LA bus" (e.g., Linear Address). Paging unit 13 converts linear addresses generated by segmentation unit 14 into physical addresses that can be used by bus interface unit 10. If paging is disabled, then the linear address generated by segmentation unit 14 becomes the physical address. If paging is enabled, the linear addresses of the microprocessor are divided into 4096-byte blocks called pages. Segmentation unit 14 can map each page into an entirely different address. For purposes of understanding the present invention, segmentation unit 14 may be assumed to be the same as that used in the commercially available Intel 80386 microprocessor. The segmentation and paging units for the Intel 80386 microprocessor are described in U.S. patent application Ser. No. 744,389, filed Jun. 13, 1985, entitled "MEMORY MANAGEMENT FOR MICROPROCESSOR".

Within the microprocessor instructions are coupled to the instruction decoder unit 15. Instruction decoder unit 15 operates in a manner similar to that of prefetcher 11. Instruction decoder unit 15 takes individual bytes from the prefetch queue and determines the number of bytes needed to complete the next instruction. Instruction decoder unit 15 operates with a control unit 19 in which microcode instructions are stored. Control unit 19 provides sequences of control signals for the microprocessor based upon the instructions decoded by instruction decode unit 15. Control unit 19 supplies these control signals to segmentation unit 14, data unit 18 and floating point unit 17. Data unit 18 is an arithmetic logic unit (ALU) which performs arithmetic and logic functions in a similar manner to those performed by the Intel 80386 microprocessor. The microprocessor also includes a floating point unit 17 for performing floating point computations.

The precise configuration the units of the microprocessor is not critical to the understanding of the present invention. Signal flow between the various units of the microprocessor will be discussed only insofar as needed to comprehend the present invention. Note that while FIG. 1 shows an example of a scaler processor, which executes only a single instruction at a time, those skilled in the art would realize that this invention is equally applicable to a superscaler processor, which is capable of executing more than one instruction simultaneously.

FIG. 2 is a block diagram showing the relationship of the alignment fault circuit of this invention and a pair of registers. In the Intel architecture, a signal alignment masking (AM), which indicates whether or not the operating system permits alignment fault checking, is stored in a bit 18 of control register CR0 101. Other bits of control register CR0 101 have other quantities stored therein which are not important to this invention. Control register CR0 101 is one of several control registers which regulate the paging and numeric co-processor operation of the microprocessor. Control register CR0 101 is conventionally connected to other portions of the microprocessor for controlling operations. In particular, control register CR0 101 may be written into and read from a conventional bus, which is not illustrated in FIG. 2. Reading from control register CR0 101 is accompanied by and enabled by a control register read control signal designated CR0read. Writing to control register CR0 101 is accompanied by and enabled by a control register write control signal designated CR0write. Control register CR0 101 may be accessed only at the highest privilege level, which is assigned to the operating system. Note that in accordance with this invention, control register CR0 101 does not have a physical latch or memory location corresponding to bit 18. Instead the bus coupling which would have been coupled to bit 18 of control register CR0 101 is directly connected to alignment fault state circuit 105. This coupling is illustrated schematically in FIG. 2.

In the Intel architecture, a signal alignment check (AC), which indicates whether or not the application program requests alignment fault checking, is stored in a bit 18 of EFLAGS register 102. Other bits of EFLAGS register 102 have other quantities stored therein which are not important to this invention. Note that bits 1, 3, 5, 15 and 19 to 31 of EFLAGS register 102 are undefined. These bits will always be read as "0" and writing to these bits has no effect. EFLAGS register 102 is conventionally connected to other portions of the microprocessor for controlling operations. In particular, EFLAGS register 102 may be written into and read from a conventional bus, which is not illustrated in FIG. 2. Reading from EFLAGS register 102 is accompanied by and enabled by an EFLAGS register read control signal designated EFLread. Writing to EFLAGS register 102 is accompanied by and enabled by an EFLAGS register write control signal designated EFLwrite. EFLAGS register 102 may be accessed at any level including the lowest privilege level, which is assigned to the application program. Note that in accordance with this invention, EFLAGS register 102 does not have a physical latch or memory location corresponding to bit 18. Instead the bus coupling which would have been coupled to bit 18 of EFLAGS register 102 is directly connected to alignment fault state circuit 105. This coupling is illustrated schematically in FIG. 2.

The alignment fault check is selected on a task by task basis. Thus each such task has its own copy of the data stored in the EFLAGS register. One of the components of a task switch involves reading from EFLAGS register 102 and writing this data to main memory or disk. This preserves the state of the prior task for later recover upon return to this prior task. The EFLAGS data corresponding to the new task is transferred from main memory or disk to the EFLAGS register 102. This involves writing to EFLAGS register 102. The data corresponding to bit 18 of the EFLAGS register in the Intel architecture controls whether the current task requests alignment checking.

Alignment fault state circuit 105 saves the alignment fault generation controlling signals. It also generates a fault gate qualifier signal that controls whether address access misalignment faults are generated. Alignment fault state circuit 105 receives several signals. Firstly, alignment fault state circuit 105 is coupled to the control register bus in place of control register CR0 101 bit 18. In the preferred embodiment, control register CR0 101 does not include any storage structure corresponding to bit 18. Note that in accordance with the Intel convention, this bit 18 of control register CR0 stores the alignment masking AM. Alignment fault state circuit 105 also receives the control signals CR0read and CR0write. In a similar fashion, alignment fault state circuit 105 is connected to the register bus in place of bit 18 of the EFLAGS register. In the preferred embodiment, EFLAGS register 102 does not include any storage structure corresponding to bit 18. Alignment fault state circuit 105 also receives the control signals EFLread and EFLwrite.

Alignment fault state circuit 105 generates 3 outputs. First, alignment fault state circuit 105 generates the fault gate qualifier signal. The fault gate qualifier signal indicates whether a fault may be generated upon detection of an address misalignment. Alignment fault state circuit 105 also generates a signal on the control register bus corresponding to bit 18. This occurs only during an active CR0read signal. This permits reading of control register CR0 101 in the same fashion as currently implemented in the Intel architecture. This serves the very important function of preserving software compatibility. Conditioning this output upon an active CR0read signal means that alignment fault state circuit 105 outputs this signal only when an instruction reads control register CR0 101. In a similar fashion, alignment fault state circuit 105 also supplies a signal corresponding to bit 18 of EFLAGS register 102 during receipt of an active the EFLread signal. Thus alignment fault state circuit 105 supplies this signal for instruction compatibility when an instruction reads EFLAGS register 102.

Alignment detector 107 makes the determination whether the generated address is aligned or misaligned. This determination is made based upon the least significant bits of the generated address and the data size. Current generation Intel microprocessors permit data sizes of 8 bits, 16 bits, 32 bits and 64 bits. In order to maintain compatibility with prior generations, all Intel microprocessors generate addresses at the byte (8 bit) level. Thus each address points to a particular byte in memory.

Table 1 shows the output of alignment detector 107 under various conditions of data size and least significant bits of the generated address. In Table 1 an "X" indicates a don't care condition. Thus bits designated "X" in Table 1 could be either "0" or "1".

TABLE 1

| Data Size | Address Bits 0–2 | Alignment Signal |
|---|---|---|
| 8 bits | XXX | Aligned |
| 16 bits | XX0 | Aligned |
|  | XX1 | Not Aligned |
| 32 bits | X00 | Aligned |
|  | XX1 | Not Aligned |
|  | X1X | Not Aligned |
| 64 bits | 000 | Aligned |
|  | XX1 | Not Aligned |
|  | X1X | Not Aligned |
|  | 1XX | Not Aligned |

For a bit size of 8 all memory accesses are aligned. For a bit size of 16, memory accesses to an even address "XX0" are aligned but accesses to an odd address "XX1" are misaligned. For a bit size of 32, memory accesses to an address divisible by 4 are aligned. All other memory accesses are misaligned. Similarly for a bit size of 64, memory accesses to an address divisible by 8 are aligned and other accesses are misaligned. Those skilled in the art would be able to provide the appropriate logical hardware for alignment detection according to Table 1. For this reason alignment detector 107 will not be further described.

The fault gate qualifier signal and the alignment signal are combined in AND gate 109. The AND gate 109 generates an active alignment fault signal only if both the fault gate qualifier signal is active and the alignment signal indicates the address is not aligned. The alignment fault signal triggers a trap or interrupt in the program being executed. In order for proper operation, the operating system must be provided with an interrupt service routine to handle this interrupt. This interrupt service routine preferably makes appropriate adjustments and then returns control to the application program.

FIG. 3 is a state diagram of alignment fault state circuit 105. Alignment fault state circuit 105 includes four states designated state one, state two, state three and state four. Alignment fault state circuit 105 has four latches 201, 202, 203 and 204 with a single token passing between them. If the token is present in a particular latch, then the corresponding state is active. If the token is absent, then the corresponding state is inactive. Receipt of an operating system level alignment masking signal AM via a write to control register CR0 101 or of an application program level alignment check signal AC via a write to EFLAGS register 102 may cause a change of state to a neighboring state depending on the current state. The presence of the token in state four 204 causes the fault gate qualifier signal to be active permitting fault generation on address misalignment. Absence of the token from state four 204 causes the fault gate qualifier signal to be inactive prohibiting fault generation on address misalignment.

Alignment fault state circuit 105 is in state one 201 when both alignment check AC and alignment masking AM are OFF. No misalignment fault can be generated while in state one. A write to control register CR0 101 with bit 18 equal to "1" by operating system the sets alignment masking AM to ON. This changes the state to state two 202. A write to EFLAGS register 102 with a bit 18 equal to "1" by the application program sets alignment check AC to ON. This changes the state to state three 203. A write to control register CR0 101 or to EFLAGS register 102 with a bit 18 equal to "0" does not change alignment fault state circuit 105 out of state one 201.

Alignment fault state circuit 105 is in state two 202 when alignment check AC is OFF and alignment masking AM is ON. No misalignment fault can be generated when in state two 202. A write to control register CR0 101 with bit 18 equal to "0" by the operating system sets alignment masking AM to OFF. This changes the state to state one 201. A write to EFLAGS register 102 with a bit 18 equal to "1" by the application program sets alignment check AC to ON. This changes the state to state four 204. A write to control register CR0 101 with bit 18 equal to "1" or to EFLAGS register 102 with a bit 18 equal to "0" does not change alignment fault state circuit 105 out of state two 202.

Alignment fault state circuit 105 is in state three 203 when alignment check AC is ON and alignment masking AM is OFF. No misalignment fault can be generated when in state three 203. A write to control register CR0 101 with bit 18 equal to "1" by the operating system sets alignment masking to ON. This changes the state to state four 204. A write to EFLAGS register 102 with a bit 18 equal to "0" by the application program sets alignment check AC to OFF. This changes the state to state one 201. A write to control register CR0 101 with bit 18 equal to "0" or to EFLAGS register 102 with a bit 18 equal to "1" does not change alignment fault state circuit 105 out of state three 203.

Alignment fault state circuit 105 is in state four 204 when alignment check AC is ON and alignment masking AM is ON. In this state alignment fault state circuit 105 generates an active fault gate qualifier signal and thus a misalignment fault can be generated. A write to control register CR0 101 with bit 18 equal to "0" by the operating system sets alignment masking AM to OFF. This changes the state to state three 203. A write to EFLAGS register 102 with a bit 18 equal to "0" by the application program sets alignment check AC to OFF. This changes the state to state two 202. A write to control register CR0 101 or to EFLAGS register 102 with a bit 18 equal to "1" does not change alignment fault state circuit 105 out of state four 204.

Upon request, hardware generates a signal corresponding to the last received operating system level alignment check AC or the last received application program level alignment masking AM based on the location of the token. To reduce power consumption, such signals are not pre-stored in alignment fault state circuit 105, but are generated new for each such output operation. These signals are provided to preserve instruction compatibility with the Intel architecture. This hardware is described in detail below.

FIG. 4 is a logic diagram of the preferred embodiment of alignment fault state circuit 105. Alignment fault state circuit 105 includes flip flops 220, 230, 240 and 250. Each of this flip flops is associated with one of the four states illustrated in FIG. 3. Flip flop 220 corresponds to state one, flip flop 230 corresponds to state two, flip flop 240 to state three and flip flop 250 to state four. In operation one of flip flops 220, 230, 240 and 250 is set indicating the corresponding state is active. The other flip flops are reset indicating that their corresponding states are inactive. Note that the state of flip flop 250 corresponds to the output fault gate qualifier signal.

The logic diagram of FIG. 4 is based on several assumptions regarding inputs. This design assumes that CR0write and EFLwrite are never simultaneously active. Thus the microprocessor may never write to these two registers at the same time. This design also assumes that CR0write and CR0read are never simultaneously active and that EFLwrite and EFLread are never simultaneously active. Thus the signals CR0(I-18) and CR0(O-18) can be on the same bidirectional line and never interfere and the signals EFL(I-18) and EFL(O-18) can be on the same bidirectional line and never interfere. These assumptions are in harmony with the available instructions for Intel microprocessors.

Note that flip flops 220, 230, 240 and 250 serve as a source of the current state to input condition gates. Thus flip flops 220, 230, 240 and 250 must be of the type that accept effective input signals conditioned upon their current state before changing state. One known type of flip flop suitable for this application includes both an input latch and an output latch. Data is initially accepted and held in the input latch. This data is then transferred to the output latch coincident with a clock signal. Thus the input state is not corrupted by the later change of the output state. Another technique to achieve this result includes providing a delay in the feedback loop between the output of flip flops 220, 230, 240 and 250, and their conditioning gates 223, 227, 233, 237, 243, 247, 253 and 257. Depending upon the operating speed of alignment fault state circuit 105, the two gate delay in the circuit illustrated in FIG. 4 may be sufficient for this purpose or additional delay may be required. In any event, there are techniques known in the art to deal with this issue.

Alignment fault state circuit 105 includes 8 input condition gates 211, 212, 213, 214, 215, 216, 217 and 218 corresponding to the 8 possible state transitions. There are eight possible state transitions listed in Table 2. Table 2 indicates the NAND gate detecting the initial conditions for each of these the state transitions.

TABLE 2

| Initial State | Final State | Name | NAND Gate |
|---|---|---|---|
| State One | State Two | T1 | 211 |
| State One | State Three | T2 | 212 |
| State Two | State One | T3 | 213 |
| State Two | State Four | T4 | 214 |
| State Three | State Four | T5 | 215 |
| State Three | State One | T6 | 216 |
| State Four | State Three | T7 | 217 |
| State Four | State Two | T8 | 218 |

The state equations for the transitions T1 to T8 are given below.

T1 = State One AND CR0write AND CR0(I-18)
T2 = State One AND EFLwrite AND EFL(I-18)
T3 = State Two AND CR0write AND ~{CR0(I-18)}
T4 = State Two AND EFLwrite AND EFL(I-18)
T5 = State Three AND CR0write AND CR0(I-18)
T6 = State Three AND EFLwrite AND ~{EFL(I-18)}
T7 = State Four AND CR0write AND ~{CR0(I-18)}
T8 = State Four AND EFLwrite AND ~{EFL(I-18)}

In the above equations: State One to State Four refer to the four states illustrated in FIG. 3; CR0write is the control register write control signal indicating a write operation to control register CR0 101; EFLwrite is the EFLAGS register write control signal indicating a write operation to EFLAGS register 102; CR0(I-18) is the input signal corresponding to bit 18 of control register CR0 101 during a control register write operation and ~{CR0(I-18)} is its logical inverse; and EFL(I-18) is the input signal corresponding to bit 18 of EFLAGS register 102 during an EFLAGS register write operation and ~{EFL(I-18)} is its logical inverse. Note that the busses coupled to control register CR0 101 and EFLAGS register 102 are bidirectional, so an I is used to designate inputs to alignment fault state circuit 105 and an O (see below) is used to designate outputs from alignment fault state circuit 105.

Alignment fault state circuit 105 illustrated in FIG. 4 is constructed using conventional NAND logic. When in state one, NAND gates 211 and 212 control state transitions. When in state one, receipt of an active CR0write signal causes NAND gate 211 to invert the input signal CR0(I-18) and supply it to NAND gates 227 and 233. If CR0(I-18) is "1" then NAND gate 227 resets flip flop 220 and NAND gate 233 sets flip flop 230. This changes the state from state one to state two. If CR0(I-18) is "0", then no change takes place. When in state one, receipt of an active EFLwrite signal causes NAND gate 212 to invert the input signal EFL(I-18) and supply it to NAND gate 227 and NAND gate 243. If EFL(I-18) is "1" then NAND gate 227 resets flip flop 220 and NAND gate 243 sets flip flop 240. This changes the state from state one to state three. If EFL(I-18) is "0" then no change of state takes place.

When in state two, NAND gates 213 and 214 control state transitions. When in state two, receipt of an active CR0write signal causes NAND gate 213 to supply CR0(I-18) to NAND gates 223 and 237. If CR0(I-18) is "0" then NAND gate 223 sets flip flop 220 and NAND gate 237 resets flip flop 230. This changes the state from state two to state one. If CR0(I-18) is "1", then no change takes place. When in state two, receipt of an active EFLwrite signal causes NAND gate 214 to invert the input signal EFL(I-18) and supply it to NAND gate 237 and NAND gate 253. If EFL(I-18) is "1" then NAND gate 237 resets flip flop 220 and NAND gate 253 sets flip flop 250. This changes the state from state two to state three. If EFL(I-18) is "0" then no change of state takes place.

When in state three, NAND gates 215 and 216 control state transitions. When in state three, receipt of an active CR0write signal causes NAND gate 215 to invert CR0(I-18) and supply it to NAND gates 247 and 253. If CR0(I-18) is "1" then NAND gate 247 resets flip flop 230 and NAND gate 253 sets flip flop 250. This changes the state from state three to state four. If CR0(I-18) is "0", then no change takes place. When in state three, receipt of an active EFLwrite signal causes NAND gate 216 to supply the input signal EFL(I-18) to NAND gate 223 and NAND gate 247. If EFL(I-18) is "0" then NAND gate 223 sets flip flop 220 and NAND gate 247 resets flip flop 240. This changes the state from state three to state one. If EFL(I-18) is "1" then no change of state takes place.

When in state four, NAND gates 217 and 218 control state transitions. When in state four, receipt of an active CR0write signal causes NAND gate 217 to supply CR0(I-18) to NAND gates 243 and 257. If CR0(I-18) is "0" then NAND gate 243 sets flip flop 240 and NAND gate 257 resets flip flop 250. This changes the state from state four to state three. If CR0(I-18) is "1", then no change takes place. When in state four, receipt of an active EFLwrite signal causes NAND gate 218 to supply the input signal EFL(I-18) to NAND gate 233 and NAND gate 257. If EFL(I-18) is "0" then NAND gate 233 sets flip flop 230 and NAND gate 257 resets flip flop 250. This changes the state from state four to state two. If EFL(I-18) is "1" then no change of state takes place.

Additional circuits control the generation of output signals during register read operations. The output signal CR0(O-18) is generated byNAND gate 261, control field effect transistor 262 and tristate buffer 263. When the CR0read signal is active, control field effect transistor 262 supplies operating power to NAND gate 261. NAND gate 261 receives the $\overline{Q}$ output signals from flip flops 230 and 250. Upon receipt of electric power conditioned on the CR0read signal, NAND gate 261 generates a "1" output signal if alignment fault state circuit is in either state two ($\overline{Q}$ of flip flop 230 is "0") or state four ($\overline{Q}$ of flip flop 250 is "0"). Otherwise the output of NAND gate 261 generates a "0" output signal. Referring again to FIG. 3, states two and four are the states in which the alignment masking signal AM is ON and states one and three are states in which the alignment masking signal AM is OFF. Tristate buffer 263, when conditioned by the CR0read signal, supplies the output of NAND gate 261 to the bidirectional line corresponding to control register CR0 101 bit 18 as CR0(O-18). Note that when the CR0read signal is not active, tristate buffer 263 assumes a high impedance isolation state. This isolates the output of tristate buffer 263 from its input and from either supply rail. Thus tristate buffer 263 does not interfere with any other signals on this line when CR0read is inactive.

The output signal EFL(O-18) is generated by NAND gate 271, control field effect transistor 272 and tristate buffer 272. When the EFLread signal is active, control field effect transistor 272 supplies operating power to NAND gate 271. NAND gate 271 receives the $\overline{Q}$ output signals from flip flops 240 and 250. Upon receipt of electric power conditioned on the EFLread signal, NAND gate 271 generates a "1" output signal if alignment fault state circuit is in either state three ($\overline{Q}$ of flip flop 240 is "0") or state four ($\overline{Q}$ of flip flop 250 is "0"). Otherwise the output of NAND gate 271 generates a "0" output signal. Referring again to FIG. 3, states three and four are the states in which the alignment check signal AC is ON and states one and two are states in which the alignment check signal AC is OFF. Tristate buffer 273, when conditioned by the EFLread signal, supplies the output of NAND gate 271 to the bidirectional line corresponding to EFLAGS register 102 bit 18 as EFL(O-18). Note that when the EFLread signal is not active, tristate buffer 273 assumes a high impedance isolation state preventing interference with any other signals on this line when EFLread is inactive.

A reset circuit including NAND gate 281 controls the initial state of alignment fault state circuit 105 upon Reset. NAND gate 281 receives a Reset signal. This Reset signal is active for a predetermined interval following initial powering of the microprocessor and also for the predetermined interval following soft Reset of the microprocessor. When the Reset signal is active NAND gate 281 supplies a "0" to NAND gates 223, 237, 247 and 257. This sets flip flop 220 and resets flip flops 230, 240 and 250. Thus alignment fault state logic 105 enters state one. When the Reset signal is inactive, the output of NAND gate 281 is "1". This signal supplied to NAND gates 223, 237, 247 and 257 does not change their response to other input signals. Note that forcing alignment fault state circuit 105 to state one upon Reset is merely a convenient design choice. The reset circuit could just as easily force alignment fault state circuit 105 to any of the other states. This embodiment of the reset circuit merely places alignment fault state circuit 105 in a known state upon initialization corresponding to a state of all "0's" in control register CR0 101 and EFLAGS register 102. It is contemplated that the operating system will write to control register CR0 101 and that the application program will write to EFLAGS register 102 before encountering any program code which needs the information stored in alignment fault state circuit 105. Thus such initialization may not be necessary.

For the Pentium, Intel created several control registers not previously defined. Intel proposes to use these control registers for emulation and testing functions. Intel does not recommend ordinary use of these control registers because Intel does not guarantee the results of such use. It is contemplated by Intel that differing results will occur for different releases of the same product. The establishment of these new control registers creates several previously undefined instructions for reading from and writing to these newly defined control registers. Because these instructions were previously undefined by Intel, no previous programs employ these instructions. Because their results on Intel products are not guaranteed, it is unlikely that they will be widely used in future programs. Thus these instructions are available for a new use in an Intel instruction set compatible microprocessor.

The present invention proposes to use one or more of these previously undefined instructions for control of the state of alignment fault state circuit 105. In the preferred embodiment of this invention, a write to control register CR256 permits control of the state of alignment fault state circuit 105. The data specified in this write to control register CR256 determines the state of alignment fault state circuit 105. This data specification may be as set forth in Table 3 below.

TABLE 3

| CR256 Write Data in Hex | Alignment Fault State Circuit |
|---|---|
| 0001 | State One |
| 0002 | State Two |
| 0003 | State Three |
| 0004 | State Four |

Note that other data combinations do not change the state of alignment fault state circuit 105. Instruction decoder unit 15 and control unit 19 are constructed in a manner known in the art to produce the signals S1, S2, S3 and S4. These signals are used to set alignment fault state circuit 105 in the corresponding state.

FIG. 4 illustrates further circuits for control of alignment fault state circuit 105. NAND gate 281 and invertors 282, 283 and 284 enable alignment fault state circuit 105 to be set into any desired mode. The S1 signal is supplied to NAND gate 281 in a fashion similar to the Reset signal described below. When the S1 signal is active NAND gate 281 generates an active "0", NAND gate 223 sets flip flop 230, NAND gate 237 resets flip flop 240, NAND gate 247 resets flip flop 250 and NAND gate 257 resets flip flop 250. This places the token in flip flop 230 corresponding to the state one. When the S1 signal is inactive, it does not change the interaction of NAND gates 223, 227, 233, 237, 242, 247, 253, 257 and 281 with other signals. When the S2 signal is active invertor 282 generates an active "0", NAND gate 227 resets flip flop 220, NAND gate 233 sets flip flop 230, NAND gate 247 resets flip flop 240 and NAND gate 257 resets flip flop 250. This places the token in flip flop 230 corresponding to the state two. When the S3 signal is active invertor 283 generates an active "0", NAND gate 227 resets flip flop 220, NAND gate 237 resets flip flop 230, NAND gate 243 sets flip flop 240 and NAND gate 257 resets flip flop 250. This places the token in flip flop 240 corresponding to the state three. When the S4 signal is active invertor 284 generates an active "0", NAND gate 227 resets flip flop 220, NAND gate 237 resets flip flop 230, NAND gate 247 resets flip flop 240 and NAND gate 253 sets flip flop 250. This places the token in flip flop 250 corresponding to the state four. These circuits permit the application program to set any desired state employing the new instruction.

What is claimed is:

1. An address alignment fault state circuit comprising:

a set of four latches, each latch holding either a first state or a second state;

a source of instructions including an alignment check on instruction executing at an application program privilege level indicating the application program enables generation of an address alignment fault state signal, an alignment check off instruction executing at said application program privilege level indicating the application program disables generation of an address alignment fault state signal, an alignment mask permit instruction executing at an operating system privilege level indicating the operating system permits generation of an address alignment fault signal if said application program has enabled generation of an address alignment fault signal via said alignment check on instruction, and an alignment mask prohibit instruction executing at said operating system privilege level indicating the operating system prohibits generation of an address alignment fault signal regardless or whether said application program has enabled generation of an address alignment fault signal via said alignment check on instruction;

an instruction responsive circuit connected to said set of four latches and said source of instructions, said instruction responsive circuit controlling said set of four latches whereby a only single one of said four latches has said first state and others of said four latches have said second state, said single one of said four latches having said first state determined by whether said instruction responsive circuit has last received said alignment check on instruction or said alignment check off instruction and whether said instruction responsive circuit has last received said alignment mask permit instruction or said alignment mask prohibit instruction; and an output circuit connected to a predetermined one of said latches, said output circuit generating an alignment fault qualifier signal enabling generation of an address alignment fault signal if said predetermined one of said latches has said first state.

2. The address alignment fault state circuit of claim 1, wherein:

said instruction responsive circuit includes a first set of input gates operative when a first latch of said set of four latches has said first state operative (1) to change said first latch to said second state and to change a second latch of said set of four latches to said first state upon receipt of said alignment mask permit instruction and (2) to change said first latch to said second state and to change a third latch of said set of four latches to said first state upon receipt of said alignment check on instruction, a second set of input gates operative when said second latch has said first state operative (3) to change said second latch to said second state and to change said first latch to said first state upon receipt of said alignment mask prohibit instruction and (2) to change second said latch to said second state and to change a fourth latch of said set of four latches to said first state upon receipt of said alignment check on instruction, a third set of input gates operative when said third latch has said first state operative (5) to change said third latch to said second state and to change said fourth latch to said first state upon receipt of said alignment mask permit instruction and (6) to change said third latch to said second state and to change said first latch to said first state upon receipt of said alignment check off instruction, and a fourth set of input gates operative when said fourth latch has said first state operative (7) to change said fourth latch to said second state and to change said third latch to said first state upon receipt of said alignment mask prohibit instruction and (8) to change said fourth latch to said second state and to change said second latch to said first state upon receipt of said alignment check off instruction.

3. The address alignment fault state circuit of claim 2, wherein:

said alignment check on instruction consists of a write to a first register having a first predetermined bit of a first state;

said alignment check off instruction consists of a write to said first register having said first predetermined bit of a second state opposite to said first state;

said alignment mask permit instruction consists of a write to a second register having a second predetermined bit of said first state; and said alignment mask prohibit instruction consists of a write to said second register having said second predetermined bit of said second state.

4. The address alignment fault state circuit of claim 1, wherein:

said instruction responsive circuit includes a first set of output gates connected to said second and fourth latches outputting a first state if either said second latch or said fourth latch has said first state upon receipt of a first register read instruction, and a second set of output gates connected to said third and fourth latches outputting a first state if either said third latch or said fourth latch has said first state upon receipt of a second register read instruction.

5. The address alignment fault state circuit of claim 4, wherein:

said instruction operative circuit wherein said first set of output gates produces no output signal in the absence of receipt of said first register read instruction, and said second set of output gates produces no output signal in the absence of receipt of said second register read instruction.

6. The address alignment fault state circuit of claim 1, wherein:

said instruction responsive circuit further includes a reset set of gates for setting a first latch of said set of four latches in said first state and other latches of said set of four latches in said second state upon receipt of a reset signal.

7. The address alignment fault state circuit of claim 1, wherein:

said instruction responsive circuit further includes a state setting set of gates (1) for setting a first latch of said set of four latches in said first state and other latches of said set of four latches in said second state upon receipt of a first state setting instruction, (2) for setting a second latch of said set of four latches in said first state and other latches of said set of four latches in said second state upon receipt of a second state setting instruction, (3) for setting a third latch of said set of four latches in said first state and other latches of said set of four latches in said second state upon receipt of a third state setting instruction, and (4) for setting a fourth latch of said set of four latches in said first state and other latches of said set of four latches in said second state upon receipt of a fourth state setting instruction.

8. The address alignment fault state circuit of claim 7, wherein:

said first state setting instruction consists of a write to a register with first data;

said second state setting instruction consists of a write to a register with second data;

said third state setting instruction consists of a write to a register with third data; and said fourth state setting instruction consists of a write to a register with fourth data.

9. An address alignment fault circuit comprising:

a set of four latches, each latch holding either a first state or a second state; a source of instructions including an alignment check on instruction executing at an application program privilege level indicating the application program enables generation of an address alignment fault state signal, an alignment check off instruction executing at said application program privilege level indicating the application program disables generation of an address alignment fault state signal, an alignment mask permit instruction executing at an operating system privilege level indicating the operating system permits generation of an address alignment fault signal if said application program has enabled generation of an address alignment fault signal via said alignment check on instruction, and an alignment mask prohibit instruction executing at said operating system privilege level indicating the operating system prohibits generation of an address alignment fault signal regardless or whether said application program has enabled generation of an address alignment fault signal via said alignment check on instruction;

an instruction responsive circuit connected to said set of four latches and said source of instructions, said instruction responsive circuit controlling said set of four latches whereby a only single one of said four latches has said first state and others of said four latches have said second state, said single one of said four latches having said first state determined by whether said instruction responsive circuit has last received said alignment check on instruction or said alignment check off instruction and whether said instruction responsive circuit has last received said alignment mask permit instruction or said alignment mask prohibit instruction;

an output circuit connected to a predetermined one of said latches, said output circuit generating an alignment fault qualifier signal if said predetermined one of said latches has said first state;

an address alignment detector receiving a set of least significant bits of address signal and a data size indicator, said address alignment detector generating an alignment signal if said address signal refers to an address misaligned to a data size corresponding to said data size indicator; and an AND gate connected to said output circuit and said address alignment detector for generating an alignment fault signal if said output circuit generates said alignment fault qualifier signal and said address alignment detector generates said alignment signal.

10. The address alignment fault circuit of claim 9, wherein:

said instruction responsive circuit includes a first set of input gates operative when a first latch of said set of four latches has said first state operative (1) to change said first latch to said second state and to change a second latch of said set of four latches to said first state upon receipt of said alignment mask permit instruction and (2) to change said first latch to said second state and to change a third latch of said set of four latches to said first state upon receipt of said alignment check on instruction, a second set of input gates operative when said second latch has said first state operative (3) to change said second latch to said second state and to change said first latch to said first state upon receipt of said alignment mask prohibit instruction and (2) to change second said latch to said second state and to change a fourth latch of said set of four latches to said first state upon receipt of said alignment check on instruction, a third set of input gates operative when said third latch has said first state operative (5) to change said third latch to said second state and to change said fourth latch to said first state upon receipt of said alignment mask permit instruction and (6) to change said third latch to said second state and to change said first latch to said first state upon receipt of said alignment check off instruction, and a fourth set of input gates operative when said fourth latch has said first state operative (7) to change said fourth latch to said second state and to change said third latch to said first state upon receipt of said alignment mask prohibit instruction and (8) to change said fourth latch to said second state and to change said second latch to said first state upon receipt of said alignment check off instruction.

11. The address alignment fault circuit of claim 10, wherein:

said alignment check on instruction consists of a write to a first register having a first predetermined bit of a first state;

said alignment check off instruction consists of a write to said first register having said first predetermined bit of a second state opposite to said first state;

said alignment mask permit instruction consists of a write to a second register having a second predetermined bit of said first state; and said alignment mask prohibit instruction consists of a write to said second register having said second predetermined bit of said second state.

12. The address alignment fault circuit of claim 9, wherein:

said instruction responsive circuit includes
a first set of output gates connected to said second and fourth latches outputting a first state if either said second latch or said fourth latch has said first state upon receipt of a first register read instruction, and
a second set of output gates connected to said third and fourth latches outputting a first state if either said third latch or said fourth latch has said first state upon receipt of a second register read instruction.

13. The address alignment fault circuit of claim 12, wherein:

said instruction operative circuit wherein
said first set of output gates produces no output signal in the absence of receipt of said first register read instruction, and
said second set of output gates produces no output signal in the absence of receipt of said second register read instruction.

14. The address alignment fault circuit of claim 9, wherein:

said instruction responsive circuit further includes a reset set of gates for setting a first latch of said set of four latches in said first state and other latches of said set of four latches in said second state upon receipt of a reset signal.

15. The address alignment fault circuit of claim 9, wherein:

said instruction responsive circuit further includes a state setting set of gates (1) for setting a first latch of said set of four latches in said first state and other latches of said set of four latches in said second state upon receipt of a first state setting instruction, (2) for setting a second latch of said set of four latches in said first state and other latches of said set of four latches in said second state upon receipt of a second state setting instruction, (3) for setting a third latch of said set of four latches in said first state and other latches of said set of four latches in said second state upon receipt of a third state setting instruction, and (4) for setting a fourth latch of said set of four latches in said first state and other latches of said set of four latches in said second state upon receipt of a fourth state setting instruction.

16. The address alignment fault circuit of claim 15, wherein:

said first state setting instruction consists of a write to a register with first data;

said second state setting instruction consists of a write to a register with second data;

said third state setting instruction consists of a write to a register with third data; and said fourth state setting instruction consists of a write to a register with fourth data.

17. The address alignment fault circuit of claim 15, wherein:

said address alignment circuit receives a set of three least significant bits of an address directed to a byte boundary, said data size indicator indicates either 8 bit, 16 bit, 32 bit or 64 bit data words, and address alignment circuit generating said alignment signal
in no case if said data size indicator indicates 8 bit data words,
if said least significant bit equals "0" and said data size indicator indicates 16 bit data words,
if said two least significant bits equals "00" and said data size indicator indicates 32 bit data words,
if said three least significant bits equals "000" and said data size indicator indicates 64 bit data words.

* * * * *